(12) United States Patent
Fukami

(10) Patent No.: US 7,692,479 B2
(45) Date of Patent: Apr. 6, 2010

(54) SEMICONDUCTOR INTEGRATED CIRCUIT DEVICE INCLUDING CHARGE PUMP CIRCUIT CAPABLE OF SUPPRESSING NOISE

(75) Inventor: Ikuo Fukami, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 158 days.

(21) Appl. No.: 11/926,589

(22) Filed: Oct. 29, 2007

(65) Prior Publication Data

US 2008/0169863 A1   Jul. 17, 2008

(30) Foreign Application Priority Data

Jan. 15, 2007   (JP)   ............................. 2007-005801

(51) Int. Cl.
  *H02M 3/07* (2006.01)
  *G05F 3/26* (2006.01)
(52) U.S. Cl. ........................................ 327/536; 363/59
(58) Field of Classification Search ........................ None
  See application file for complete search history.

(56) References Cited

U.S. PATENT DOCUMENTS

| | | | |
|---|---|---|---|
| 5,656,954 A * | 8/1997 | Kondoh et al. | 326/115 |
| 5,689,208 A | 11/1997 | Nadd | |
| 6,201,446 B1 * | 3/2001 | Ananth | 330/308 |
| 6,438,005 B1 | 8/2002 | Walter | |
| 6,445,623 B1 | 9/2002 | Zhang et al. | |
| 6,696,895 B2 * | 2/2004 | Tsukuda | 330/264 |
| 7,498,788 B2 * | 3/2009 | Yang | 323/283 |
| 2003/0174524 A1 | 9/2003 | Botker et al. | |

FOREIGN PATENT DOCUMENTS

| | | |
|---|---|---|
| JP | 8-336277 A | 12/1996 |
| JP | 2005-33865 A | 2/2005 |

* cited by examiner

*Primary Examiner*—Lincoln Donovan
*Assistant Examiner*—Terry L Englund
(74) *Attorney, Agent, or Firm*—Sughrue Mion, PLLC

(57) ABSTRACT

In a semiconductor integrated circuit device including a charge pump circuit flowing an operating current therethrough, a current circuit is adapted to receive the operating current and a substantially constant current and generate an inverse current relative to the operating current and the substantially constant current.

10 Claims, 5 Drawing Sheets

SEMICONDUCTOR INTEGRATED CIRCUIT DEVICE INCLUDING CHARGE PUMP CIRCUIT CAPABLE OF SUPPRESSING NOISE

BACKGROUND OF THE INVENTION

1. Field of the Invention

The present invention relates to a semiconductor integrated circuit device including a charge pump circuit.

2. Description of Related Art

Recently, electronic units have been introduced into automobiles to realize security, comfort and low power consumption. As a result, the noise generated by the operation of the electronic units affects the operation of the electronic units per se. Preferably, such noise should be reduced.

In a first prior art semiconductor integrated circuit device including a semiconductor power switch, a charge pump circuit for generating a sufficiently higher voltage than a power supply voltage is used to completely turn ON the semiconductor power switch (see: FIG. 2 of Japanese Unexamined Patent Publication (Kokai) No. 8-336277). The charge pump circuit is constructed by a rectangular oscillating circuit for generating a clock signal and a step-up circuit clocked by the clock signal for generating a voltage higher than the power supply voltage. In this case, the step-up circuit includes a capacitor and diodes. This will be explained later in detail.

In the above-described first prior art semiconductor integrated circuit device, however, the charging and discharging operation of the capacitor at a high frequency caused by the rectangular oscillating circuit flows an operating current including a large ripple component through the charge pump circuit, thus generating a large noise.

In a second prior art semiconductor integrated circuit device, a constant current source is connected in series to the charge pump circuit of the first prior art semiconductor integrated circuit device, so that the constant current of the constant current source absorbs the large ripple component of the operating current flowing through the charge pump circuit, thus decreasing the noise. Also, a Zener diode is connected in parallel to the charge pump circuit of the first prior art semiconductor integrated circuit device (see: FIG. 4 of Japanese Unexamined Patent Publication (Kokai) No. 8-336277). This also will be explained later in detail.

In the above-described second prior art semiconductor integrated circuit device, however, if the power supply voltage is too low, i.e., lower than the Zener voltage such as 6V of the Zener diode, the constant current of the constant current source cannot absorb the ripple component of the operating current of the charge pump circuit, which would not suppress the noise.

Note that Japanese Unexamined Patent Publication (Kokai) No. P2005-33865A discloses a semiconductor integrated circuit device including a charge pump circuit where an output current is detected by a current detection circuit and an input current twice the output current is supplied by a current limiting circuit to the charge pump circuit.

SUMMARY

The present invention seeks to solve one or more of the above-mentioned problems.

According to the present invention, in a semiconductor integrated circuit device including a charge pump circuit flowing an operating current therethrough, a current circuit is adapted to receive the operating current and a substantially constant current and generate an inverse current relative to the operating current and the substantially constant current.

The operating current of the charge pump circuit is compensated for by the inverse current within the current circuit.

BRIEF DESCRIPTION OF THE DRAWINGS

The above and other objects, advantages and features of the present invention will be more apparent from the following description of certain preferred embodiments as compared with the prior art, taken in conjunction with the accompanying drawings, wherein.

DETAILED DESCRIPTION OF PREFERRED EMBODIMENTS

Before describing the preferred embodiments, prior art semiconductor integrated circuit devices will be explained in detail with reference to FIGS. 1, 2 and 3 in order to facilitate the understanding of the present invention.

Figure 1:
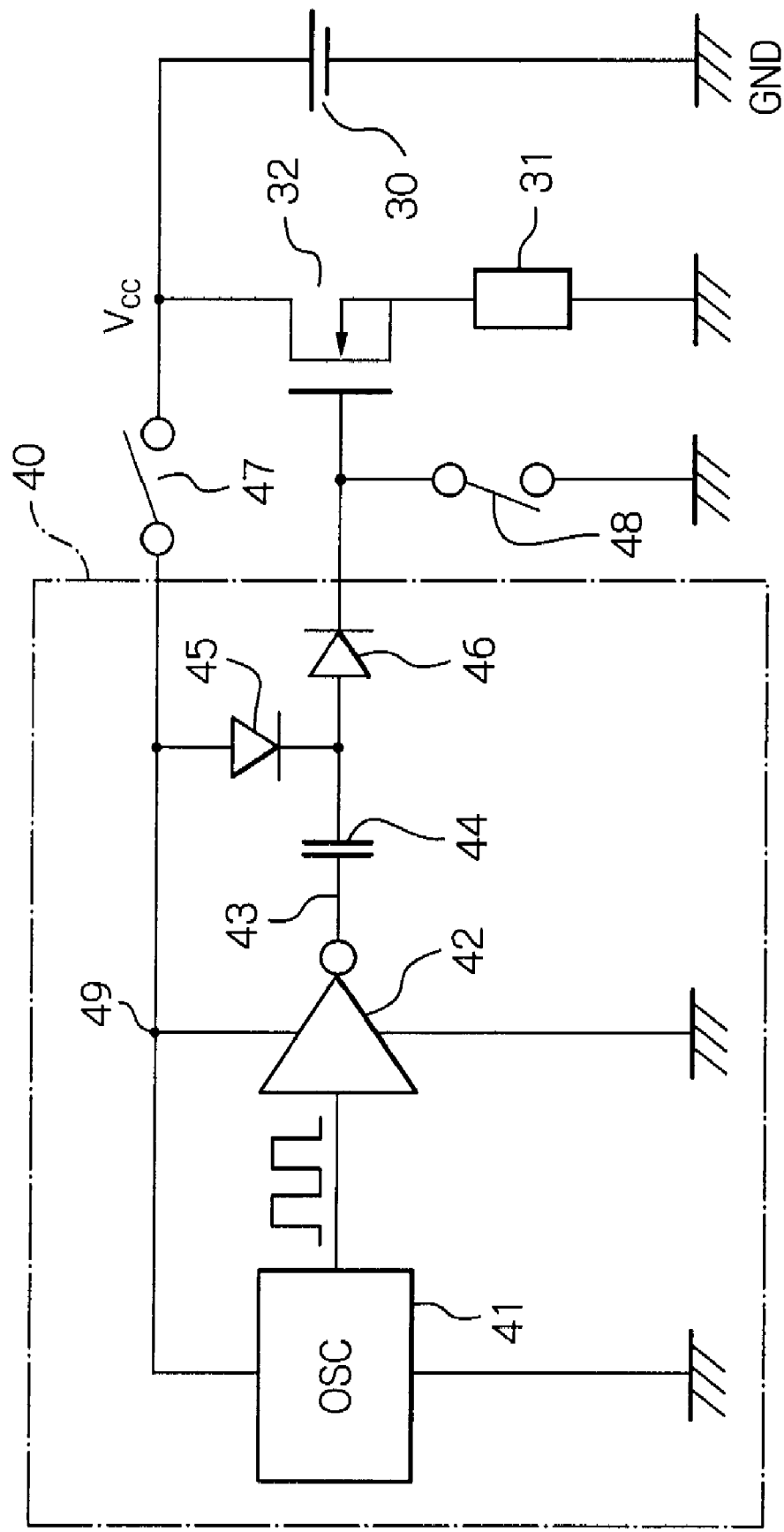
FIG. 1 is a circuit diagram illustrating a first prior art semiconductor integrated circuit device.

In FIG. 1, which illustrates a first prior art semiconductor integrated circuit device (see: FIG. 2 of Japanese Unexamined Patent Publication (Kokai) No. 8-336277), a power source 30 is connected via a power supply line $V_{CC}$ and a ground line GND to an n-channel power MOS transistor 32 and a load 31 connected in series. The voltage at the ground line GND is a common ground such as a vehicle body.

In order to completely turn ON the n-channel power MOS transistor 32, a voltage applied to the gate needs to be higher than $V_{CC}$ by 5 to 10V. Such a high voltage is generated by a charge pump circuit 40 for generating a voltage of $2 \cdot V_{CC}$.

The charge pump circuit 40 is constructed by a rectangular oscillating circuit 41 whose output is buffered by an inverter 42. The output node 43 of the inverter 42 is connected to a capacitor 44. The capacitor 44 is connected via a diode 45 to the power supply line $V_{CC}$, so that the capacitor 44 is charged by the power supply line $V_{CC}$. The node between the capacitor 44 and the diode 45 is connected via a diode 46 is connected to the gate of the n-channel power MOS transistor 32. Switches 47 and 48 are provided such that the switch 47 connects a node 49 from the power supply line $V_{CC}$ and the switch 48 connects the gate of the n-channel power MOS transistor 32 to the ground line GND and disconnects the gate of the n-channel power MOS transistor 32 from the ground line GND.

The charging and discharging operation of the capacitor 44 at a high frequency caused by the rectangular oscillating circuit 41 generates a large noise.

Figure 2:
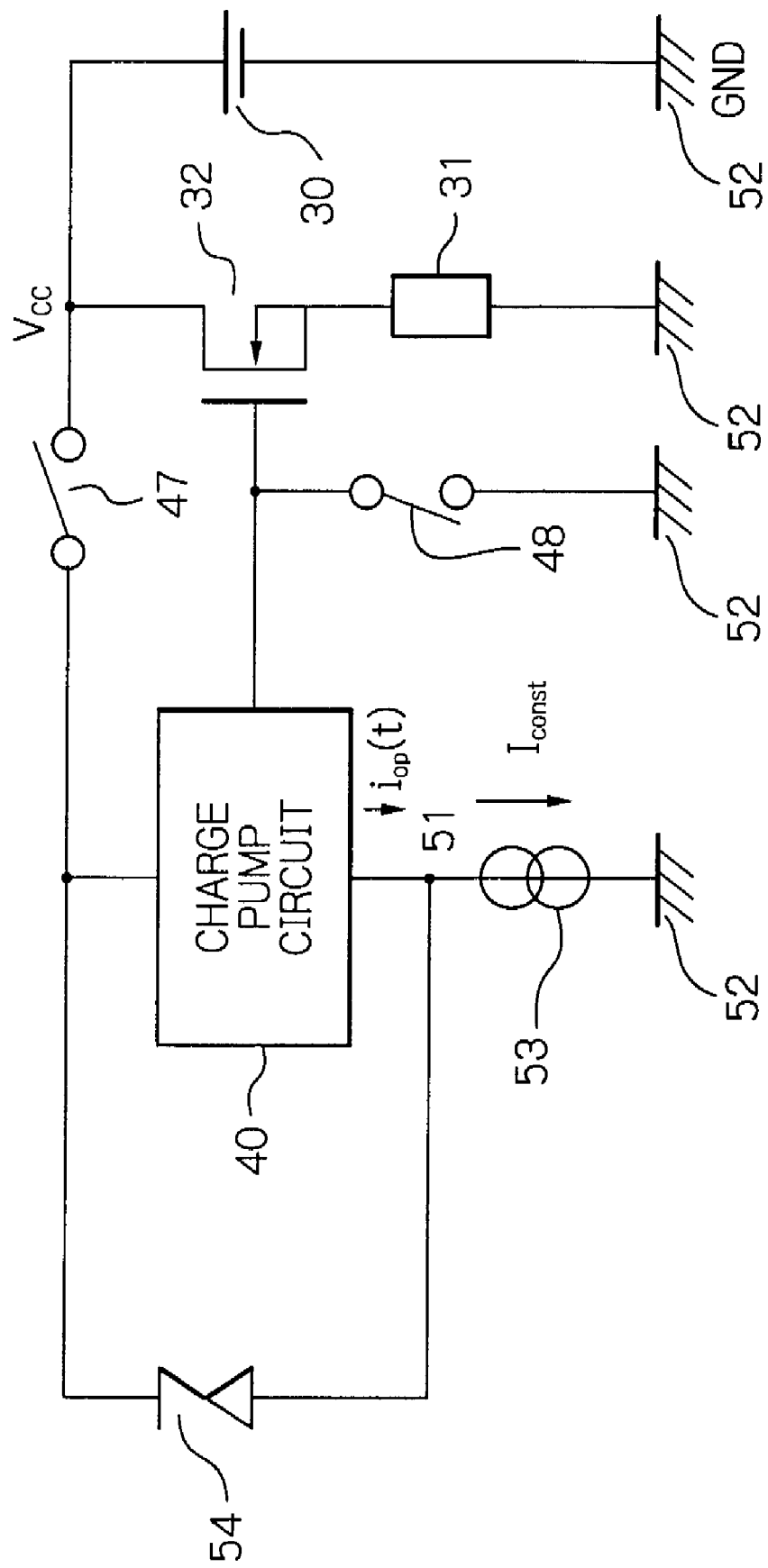
FIG. 2 is a circuit diagram illustrating a second prior art semiconductor integrated circuit device.
Figure 4:
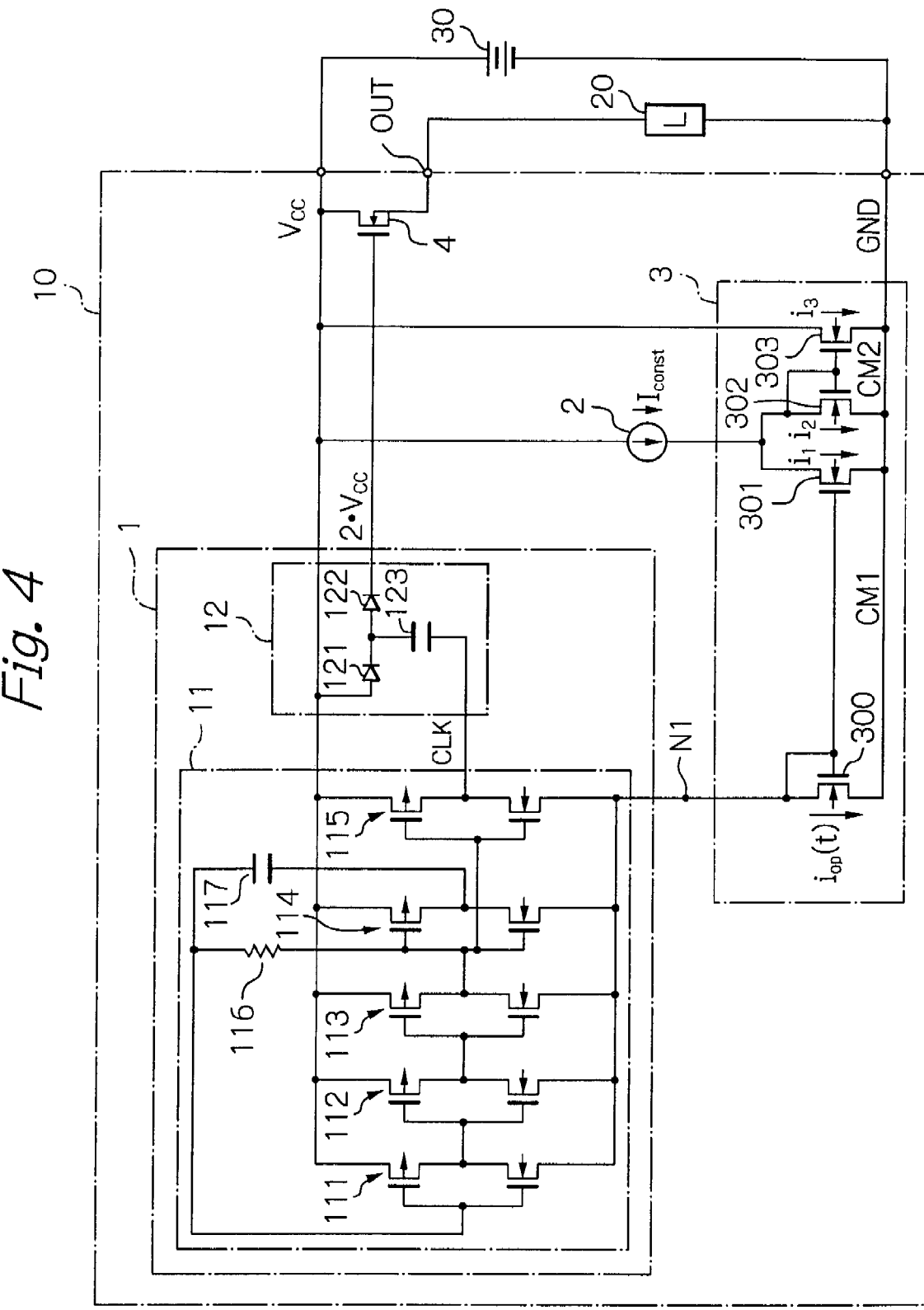
FIG. 4 is a circuit diagram illustrating a first embodiment of the semiconductor integrated circuit device according to the present invention.

In FIG. 2, which illustrates a second prior art semiconductor integrated circuit device (see: FIG. 4 of Japanese Unexamined Patent Publication (Kokai) No. 8-336277), the charge pump circuit 40 of FIG. 1 is connected via a floating node 51 to a constant current source 53 which is also connected to a ground node 52 which serves as the ground line GND. Further, a Zener diode 54 is connected in parallel to the charge pump circuit 40.

Figure 3:
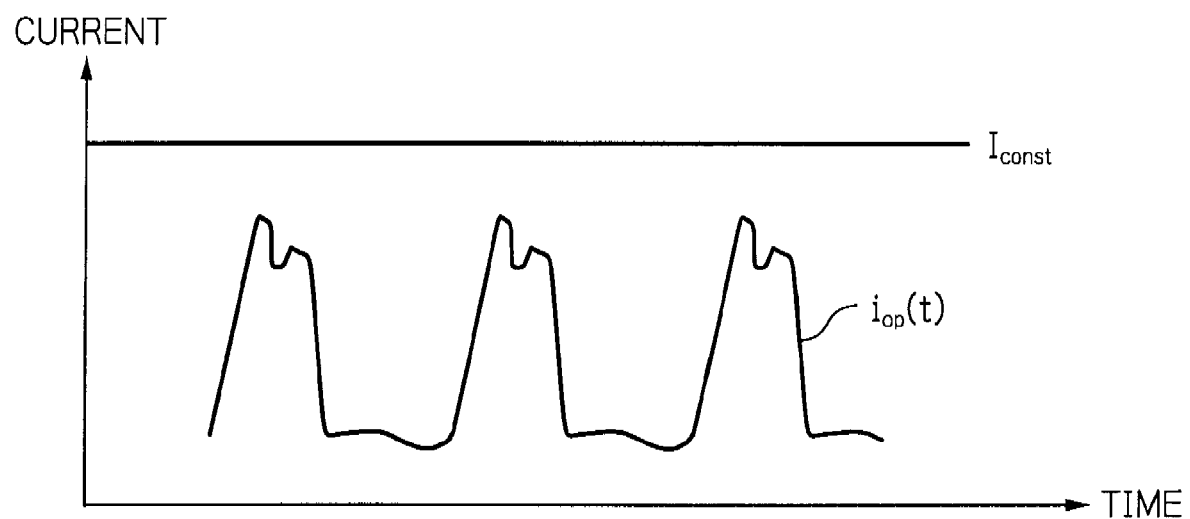
FIG. 3 is a timing diagram showing the operating current of the charge pump circuit and the constant current of the constant current source of FIG. 2.

As a result, as illustrated in FIG. 3 (see: FIG. 8 of Japanese Unexamined Patent Publication (Kokai) No. 8-336277), even when an operating current $i_{op}(t)$ caused by the charging and discharging operation of the capacitor 44 have a large ripple component, a constant current $I_{const}$ defined by the constant current source 53 absorbs such a large ripple component of the operating current $i_{op}(t)$, so that the constant current $I_{const}$ flows from the power supply line $V_{CC}$ to the ground line GND. In other words, an approximate DC current flows from the power supply line $V_{CC}$ to the ground line GND, so as to suppress the noise.

In the semiconductor integrated circuit device of FIG. 2, however, if the voltage at the power supply line $V_{CC}$ is too low, i.e., lower than the Zener voltage such as 6V of the Zener diode 54, a current flowing therethrough is very small, so that $$I_{const} \approx i_{op}(t)$$

As a result, the current $I_{const}$ is not constant, so that the current $I_{const}$ cannot absorb the ripple component of the operating current $i_{op}(t)$ of the charge pump circuit 40, which would not suppress the noise.

In FIG. 4, which illustrates a first embodiment of the semiconductor integrated circuit device according to the present invention, a semiconductor integrated circuit device 10 is constructed by a charge pump circuit 1 connected between the power supply line $V_{CC}$ and a connection node N1, a constant current source 2 connected to the power supply line $V_{CC}$ for generating a constant current $I_{const}$, a current circuit 3 connected to the connection node N1, the constant current source 2, the power supply line $V_{CC}$ and the ground line GND, and an n-channel power MOS transistor 4 controlled by the charge pump circuit 1 is connected between the power supply line $V_{CC}$ and an output terminal OUT.

A load 20 and a power source 30 are connected to a semiconductor integrated circuit device 10. In more detail, the load 20 is connected between the output terminal OUT and the ground line GND. The power source 30 is connected between the power supply line $V_{CC}$ and the ground line GND.

The charge pump circuit 1 is formed by a rectangular oscillating circuit 11 for generating a clock signal CLK and a step-up circuit 12 clocked by the clock signal CLK to generate a step-up voltage $2 \cdot V_{CC}$. In more detail, the clock generating circuit 11 includes CMOS inverters 111, 112, 113 and 114 connected in series between the power supply line $V_{CC}$ and the connection node N1, a CMOS inverter 115 connected to the output of the CMOS inverter 113 for generating the clock signal CLK, a resistor 116 connected between the output of the CMOS inverter 113 and the input of the CMOS inverter 111, and a capacitor 117 connected between the output of the CMOS inverter 114 and the input of the CMOS inverter 111. On the other hand, the step-up circuit 12 includes diodes 121 and 122 connected in series between the power supply line $V_{CC}$ and the gate of the n-channel power MOS transistor 4, and a capacitor 123 connected between the output of the CMOS inverter 115 and the connection node between the diodes 121 and 122. In this case, the anode of the diode 121 is connected to the power supply line $V_{CC}$, and the cathode of the diode 121 is connected to the anode of the diode 122 whose cathode is connected to the gate of the n-channel power MOS transistor 4.

The constant current source 2 is formed by an n-channel depletion type MOS transistor where a source is connected to a gate, for example.

The current circuit 3 is formed by four n-channel MOS transistors 300, 301, 302 and 303. The n-channel MOS transistors 300 and 301 form a current mirror circuit CM1 with an input current terminal connected to the connection node N1 and an output current terminal connected to the constant current source 2. On the other hand, the n-channel MOS transistors 302 and 303 form a current mirror circuit CM2 with an input current terminal connected to the constant current source 2 and an output current terminal connected to the power supply line $V_{CC}$.

Thus, since the n-channel MOS transistor 301 forms the current mirror circuit CM1 with the n-channel MOS transistor 300, a current $i_1$ flowing through the n-channel MOS transistor 301 is represented by $$i_1 = i_{op}(t)$$

Also, since the n-channel MOS transistors 301 and 302 have a common drain, a current $i_2$ flowing through the n-channel MOS transistor 302 is represented by $$i_2 = I_{const} - i_{op}(t)$$

Further, since the n-channel MOS transistor 303 forms the current mirror circuit CM2 with the n-channel MOS transistor 302, a current $i_3$ flowing through the n-channel MOS transistor 303 is represented by $$i_3 = I_{const} - i_{op}(t)$$

Thus, in the semiconductor integrated circuit device 10 of FIG. 4, the total current that flows from the power supply line $V_{CC}$ to the ground line GND is $$i_{op}(t) + i_1 + i_2 + i_3 = i_{op}(t) + i_{op}(t) + I_{const} - i_{op}(t) + I_{const} - i_{op}(t)$$

$$= 2 \cdot I_{const}$$

Thus, the operating current $i_{op}(t)$ flowing through the n-channel MOS transistor 300 is compensated for by the currents $i_1$, $i_2$ and $i_3$ within the current circuit 3, so that the constant current $2 \cdot I_{const}$ flows from the power supply line $V_{CC}$ to the ground line GND. In other words, an approximate DC current flows from the power supply line $V_{CC}$ to the ground line GND, so as to suppress the noise. In this case, in order for the constant current $2 \cdot I_{const}$ to absorb the large ripple component of the operating current $i_{op}(t)$ of the charge pump circuit 1, a large current does not need to be supplied to the semiconductor integrated circuit device.

On the other hand, even if the voltage at the power supply line $V_{CC}$ is low, but higher than twice the threshold voltage of the MOS transistors, i.e., about 2V, the constant current $2 \cdot I_{const}$ can be maintained. As a result, the current $2 \cdot I_{const}$ is constant, so that the constant current $2 \cdot I_{const}$ can absorb the ripple component of the operating current $i_{op}(t)$ of the charge pump circuit 1, which would suppress the noise.

Figure 5:
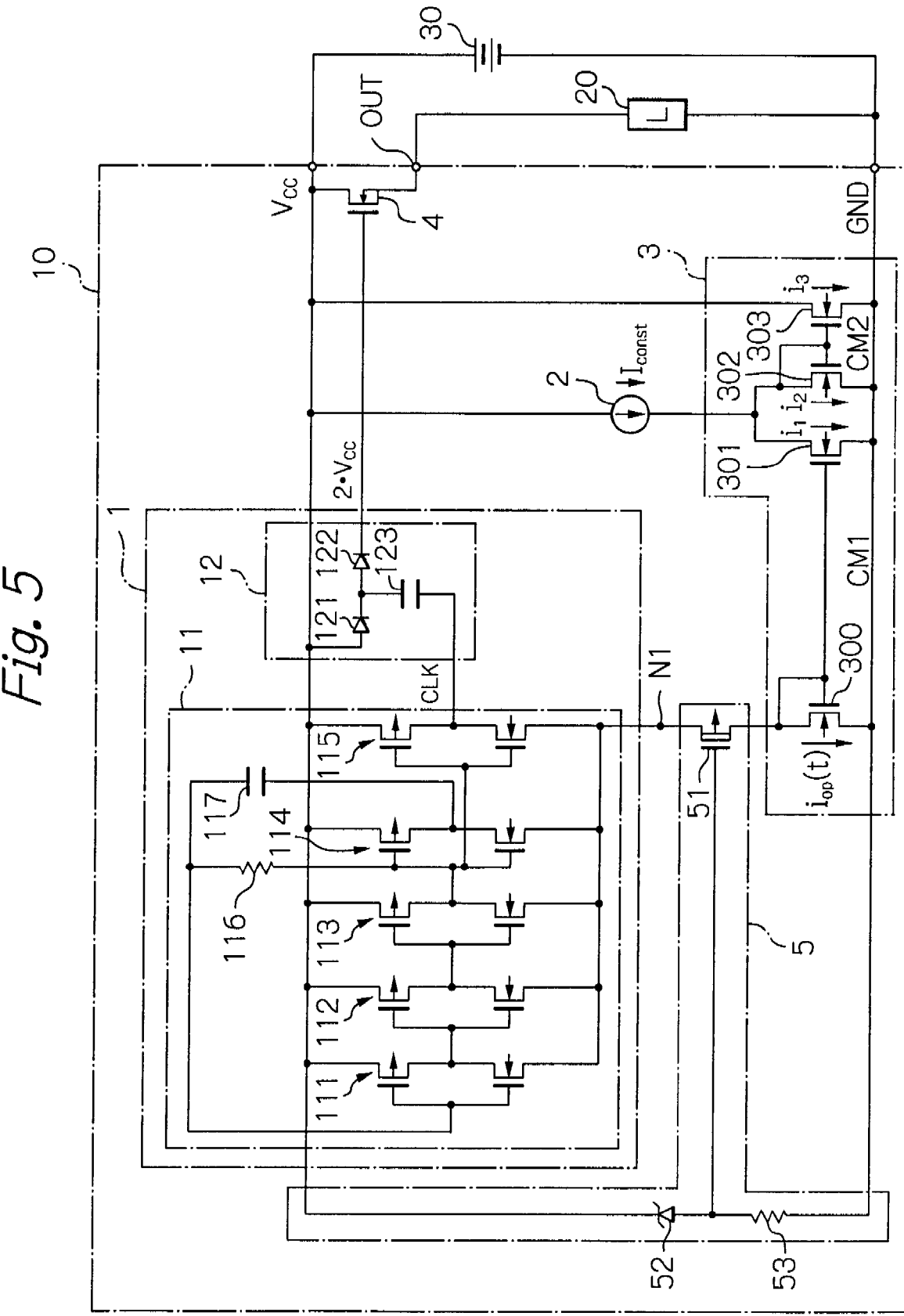
FIG. 5 is a circuit diagram illustrating a second embodiment of the semiconductor integrated circuit device according to the present invention.

In FIG. 5, which illustrates a second embodiment of the semiconductor integrated circuit device according to the present invention, a voltage clamp circuit 5 is added to the elements of the semiconductor integrated circuit device 10 of FIG. 4. The voltage clamp circuit 5 is formed by a depletion-type p-channel MOS transistor 51, a Zener diode 52 whose Zener voltage is 6V, for example, and a resistor 53. In this case, the depletion-type p-channel MOS transistor 51 is connected between the connection node N1 and the n-channel MOS transistor 300, and is controlled by a voltage between the Zener diode 52 and the resistor 53 connected in series between the power supply line $V_{CC}$ and the ground line GND.

Note that the resistor 53 can be replaced by a drain-to-gate connected MOS transistor serving as a resistance element.

Also, the Zener diode 52 can limit the voltage applied to the capacitor 123 to a definite voltage such as 6V, the capacitor 123 can have a thin and small insulator, which is advantageous in integration.

Further, even when the voltage at the power supply line $V_{CC}$ is lower than the Zener voltage such as 6V of the Zener diode 52 so that the Zener diode 52 is in an OFF state, since a bias voltage is still applied through the resistor 53 to the gate of the depletion-type p-channel MOS transistor 51, the charge pump circuit 1 can be normally operated.

In the above-described embodiments, the power supply line $V_{CC}$ and the ground line GND can be replaced with each other. In this case, the p-channel and n-channel MOS transistors are replaced by n-channel and p-channel MOS transistors, respectively.

It is apparent that the present invention is not limited to the above-described embodiments, but may be modified and changed without departing from the scope and spirit of the present invention.

What is claimed is:

1. A semiconductor integrated circuit device, comprising:
   a charge pump circuit flowing an operating current therethrough;
   a current circuit adapted to receive said operating current and a substantially constant current and generate an inverse current relative to said operating current and said substantially constant current;
   a constant current source for generating said substantially constant current circuit; and
   first and second power supply lines, said first power supply line being connected to said charge pump circuit and said constant current source,
   said current circuit comprising:
   a first current mirror circuit having a first input current terminal connected to said charge pump circuit and a first output current terminal connected to said constant current source; and
   a second current mirror circuit having a second input current terminal connected to said constant current source and a second output current terminal, wherein,
   said first current mirror circuit comprising:
   a first transistor connected between said charge pump circuit and said second power supply line; and
   a second transistor connected between said constant current source and said second power supply line, said first and second transistors having a first common control terminal,
   said second current mirror circuit comprising:
   a third transistor connected between said constant current source and said second power supply line; and
   a fourth transistor connected between said first and second power supply lines, said third and fourth transistors having a second common control terminal,
   wherein the semiconductor integrated circuit device further comprises a voltage clamp circuit connected between said first and second power supply lines and connected to said charge pump circuit and said first transistor.

2. The semiconductor integrated circuit device as set forth in claim 1, said voltage clamp circuit comprises:
   a fifth transistor connected between said charge pump circuit and said first transistor;
   a Zener diode connected between said first power supply line and a control terminal of said fifth transistor; and
   a resistance element connected between the control terminal of said fifth transistor and said second power supply line.

3. The semiconductor integrated circuit device as set forth in claim 1, wherein said charge pump circuit comprises:
   a rectangular oscillating circuit adapted to generate a clock signal; and
   a step-up circuit clocked by said clock signal.

4. A semiconductor integrated circuit device, comprising:
   a charge pump circuit flowing an operating current therethrough; and
   a current circuit adapted to receive said operating current and a substantially constant current and generate an inverse current relative to said operating current and said substantially constant current,
   wherein said charge pump circuit comprises:
   a rectangular oscillating circuit adapted to generate a clock signal; and
   a step-up circuit clocked by said clock signal.

5. The semiconductor integrated circuit device as set forth in claim 4, further comprising a constant current source for generating said substantially constant current circuit,
   said current circuit comprising:
   a first current mirror circuit having a first input current terminal connected to said charge pump circuit and a first output current terminal connected to said constant current source; and
   a second current mirror circuit having a second input current terminal connected to said constant current source and a second output current terminal.

6. The semiconductor integrated circuit device as set forth in claim 5, further comprising first and second power supply lines, said first power supply line being connected to said charge pump circuit and said constant current source,
   said first current mirror circuit comprising:
   a first transistor connected between said charge pump circuit and said second power supply line; and
   a second transistor connected between said constant current source and said second power supply line, said first and second transistors having a first common control terminal,
   said second current mirror circuit comprising:
   a third transistor connected between said constant current source and said second power supply line; and
   a fourth transistor connected between said first and second power supply lines, said third and fourth transistors having a second common control terminal.

7. A semiconductor integrated circuit device, comprising:
   a charge pump circuit flowing an operating current therethrough;
   a current circuit adapted to receive said operating current and a substantially constant current and generate an inverse current relative to said operating current and said substantially constant current;
   a constant current source for generating said substantially constant current circuit;
   first and second power supply lines, said first power supply line being connected to said charge pump circuit and said constant current source; and
   a voltage clamp circuit connected between said first and second power supply lines and connected to said charge pump circuit and a first transistor of the current circuit, the first transistor connected between said charge pump circuit and said second power supply line.

8. The semiconductor integrated circuit device as set forth in claim 7, wherein said current circuit comprises:
   a first current mirror circuit including said first transistor and having a first input current terminal connected to said charge pump circuit and a first output current terminal connected to said constant current source; and a second current mirror circuit having a second input current terminal connected to said constant current source and a second output current terminal.

9. The semiconductor integrated circuit device as set forth in claim 8, wherein said first current mirror circuit comprises:

said first transistor; and a second transistor connected between said constant current source and said second power supply line, said first and second transistors having a first common control terminal, said second current mirror circuit comprising:

a third transistor connected between said constant current source and said second power supply line; and a fourth transistor connected between said first and second power supply lines, said third and fourth transistors having a second common control terminal.

10. The semiconductor integrated circuit device as set forth in claim 7, wherein said charge pump circuit comprises:

a rectangular oscillating circuit adapted to generate a clock signal; and a step-up circuit clocked by said clock signal.

\* \* \* \* \*